Dec. 3, 1940.　　　　G. F. RUOPP　　　　2,223,580
GAUGE CONSTRUCTION
Filed March 12, 1940　　　　2 Sheets-Sheet 1

INVENTOR.
George F. Ruopp
BY Harry H. Hitzeman
ATTORNEY.

Dec. 3, 1940.  G. F. RUOPP  2,223,580
GAUGE CONSTRUCTION
Filed March 12, 1940  2 Sheets-Sheet 2

INVENTOR.
George F. Ruopp
BY Harry H. Hitzeman
ATTORNEY.

Patented Dec. 3, 1940

2,223,580

UNITED STATES PATENT OFFICE 2,223,580

GAUGE CONSTRUCTION

George F. Ruopp, Marshalltown, Iowa, assignor to Marshalltown Manufacturing Company, a corporation of Iowa Application March 12, 1940, Serial No. 323,579

6 Claims. (Cl. 73—109)

My invention relates to improvements in gauge construction, and more particularly to gauges of the pressure responsive type.

My invention relates more particularly to improvements in the construction of pressure gauges of the type wherein a syphon trap and pressure responsive element are positioned between the medium whose pressure is indicated and the indicator actuating mechanism.

Pressure gauges of the type to which I refer have been on the market for a comparatively long time. As early as 1895, N. W. Pratt obtained U. S. Patent No. 534,007 in which he showed the combination of a trap section and a pressure responsive element positioned entirely within the gauge housing.

In a more recent patent to Manning, U. S. Patent No. 957,471, issued in 1910, a trap or syphon and a Bourdon tube are shown as an integral tubular member positioned entirely within the gauge housing. Other later patents have shown constructions which purport to be improvements over the showing of the above-mentioned patents and to correct some of the faults of the same.

The principal object of the present invention is to provide in a pressure gauge an improved form of syphon tube and Bourdon tube construction.

A further object of the invention is to provide improved means associated with concentric convolutions of an integral tube for effecting a trap or syphon portion and a Bourdon tube portion.

A further object of the invention is to make said means adjustable so that the proportionate lengths of the Bourdon tube portion and the trap portion can be changed to alter the travel of the indicating needle.

A further object of the invention is to provide an improved adjusting means associated with the Bourdon tube and trap portions of an integral tube connected to the gauge housing in such manner that any adjustment may be easily and quickly made without removing the gauge from the apparatus or boiler upon which it is located.

A further object is to provide an improved gauge construction wherein a trap portion and a Bourdon tube portion are formed in an integral tube which is only connected to the post or other supporting structure at one end, thereby requiring only one solder joint.

A further object of the invention is to provide a gauge construction of the type mentioned that is easily and simply constructed and wherein the curvature of the several convolutions of the integral tube may vary in shape within broader limits as contrasted with the forms of construction wherein the convolutions of the integral tube are required to pass through specified slots or openings on the support post.

Other objects and advantages will be more apparent from the following description wherein reference is had to the accompanying two sheets of drawings, upon which—

Figure 1:
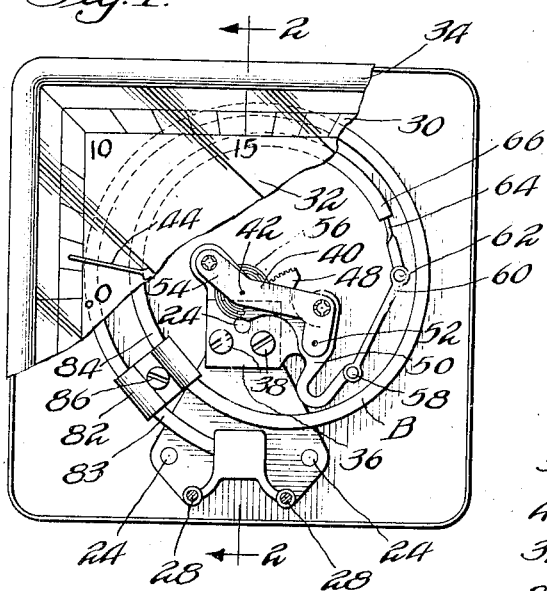
Fig. 1 is a front elevational view of a common form of steam gauge embodying my invention, with a portion of the case, dial and indicating needle broken away to more clearly show other parts.
Figure 2:
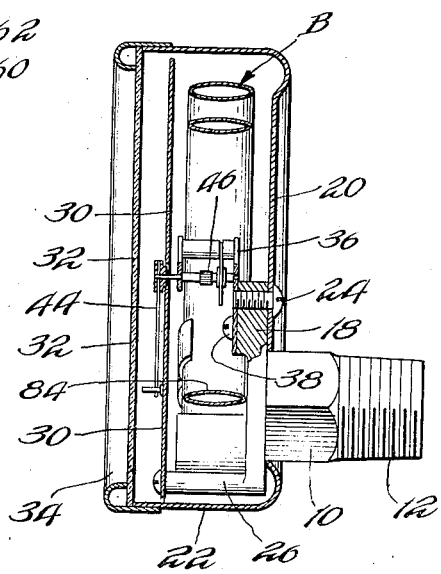
Fig. 2 is a vertical cross sectional view of the same taken generally on the line 2—2 of Fig. 1.

In the embodiment of the invention which I have chosen to illustrate, I have shown the tubular post 10 which is threaded at 12 to provide means for mounting the gauge upon a steam boiler or other apparatus of a system upon which the gauge is designed to be connected for operation. The post 10 may have a horizontal bore 14 which extends into the body portion 16 of the same. It is also provided with an upwardly directed flange 18 that is connected to the back 20 of the gauge housing 22 by the screw members 24. A pair of bosses 26 are formed at the lower end of the plate 18 with appropriate tapped openings to receive the screw members 28 that support the dial 30 in the front of the gauge. A glass 32 and suitable bezel 34 are positioned upon the front of the gauge. A plate 36 may be fastened to the upper end of flange 18 by suitable screw members 38. The plate may support the indicator operating mechanism 40. This mechanism may be similar to any well known type at present on the market and may include a shaft 42 which carries an indicator needle 44. The shaft is journalled in suitable bearings in the bracket 36 and is provided with a pinion 46 which meshes with the toothed segment 48 carried by the lever 50. The lever 50 is pivotally mounted at 52 upon a fixed arm 54 secured to the bracket 36. A coiled spring 56 is provided having one end secured to the indicator shaft 42 and having its opposite end fastened to a stationary portion of bracket 36. This spring is provided to return the indicating needle 44 back to zero on the dial 30 when there is no pressure in the system to which the gauge is attached.

The free end of lever 50 may be pivotally connected at 58 to a link 60 which in turn is pivotally connected at 62 to a fixed arm 64 secured to the end 66 of the pressure responsive means.

Figure 3:
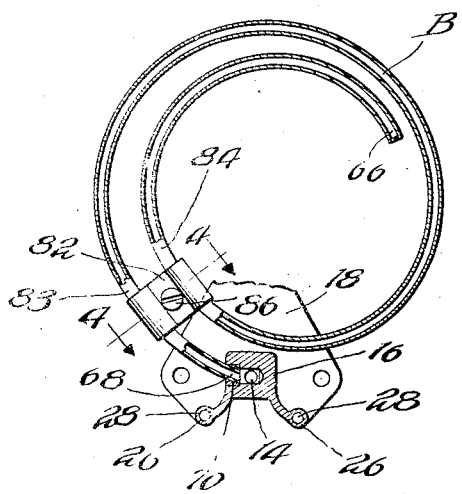
Fig. 3 is a fragmentary view of the support and integral tube with parts broken in section to more clearly show other parts.

The pressure responsive means which I provide may consist of a Bourdon tube member B which is formed in a double concentric or spiral loop as shown in Fig. 3. The forward end 68 of the tube B may be soldered at an opening 70 in post 10 in communication with the inlet passage 14.

Figure 4:
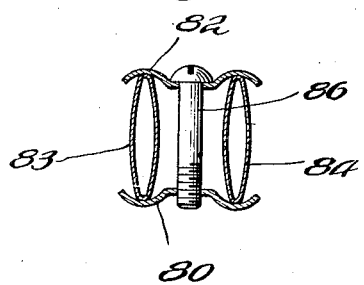
Fig. 4 is an enlarged cross sectional view taken on the line 4—4 of Fig. 3.

In order to provide a Bourdon tube or pressure responsive section in the tube B which is of less than 360°, I have provided clamping means to rigidly connect two parallel portions of the loops of the integral tube together. This means (see Figs. 3 and 4), may comprise a pair of comparatively flat clamping members 80 and 82 adapted to embrace the parallel sections 83 and 84 of the tube B. The clamp members are held together in a fixed position by a screw member 86 which passes through a drilled opening in the clamp member 82 and enters a screw threaded opening in the clamp member 80.

The purpose of providing the integral tube with a double loop such as I have described will now be explained. With a tube such as I have described, when a gauge is placed in operation and pressure arises, a certain amount of air at atmospheric pressure which is in the passageway 14 and the tube B will be driven into the free end of the tube or to the indicator actuating portion which is the portion of the tube from the free end 66 to the rigid clamping means 80 and 82.

In operation, a certain amount of condensate will collect in the coils of the tube and will thus form a seal between the air in the pressure responsive portion of the tube and the conduit 14. Thus with the actual operating portion of the Bourdon tube more or less filled with air or water under compression, it will be apparent that a much more accurate operation or indication of the pressure in the boiler will be given than if the same were filled with condensate.

This is due to the reason that no changes in temperature will take place and thereby effect the operation of the tube. There is no possibility of freezing in extreme cold temperature due to the presence of air, and with the additional length in the path of pressure going from the boiler, the rate pulsations or sudden momentary changes of pressure will not effect the indicating medium as much as heretofore.

It will further be obvious that the manner in which the combined syphon and Bourdon tube is mounted requires a soldering operation at only one point, and this effects a considerable saving in the cost of manufacture as well as insurance against the possibility of leakage at two or three points. Further, in operation there is no possibility of flexure of the tube at inlet 70, thus eliminating any reason for leakage at this point.

Figure 5:
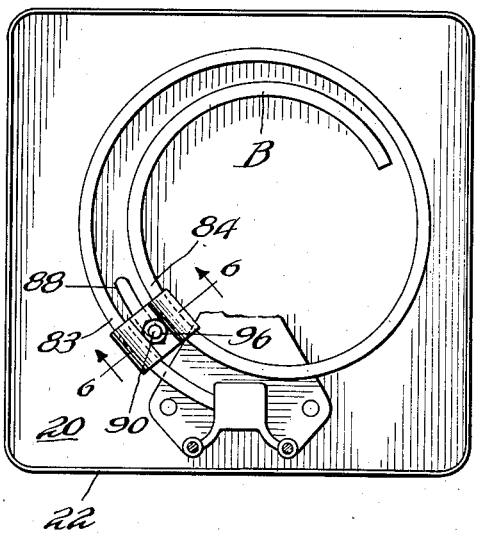
Fig. 5 is a fragmentary front view showing a modified form of construction.
Figure 6:
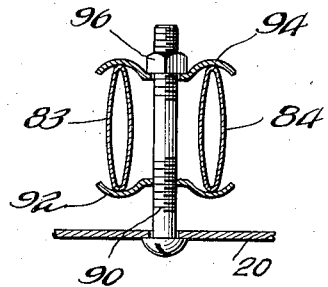
Fig. 6 is a cross section view of the same taken on the line 6—6 of Fig. 5.

In Figs. 5 and 6 I have shown a modified form of rigid positioning means for the Bourdon tube and trap sections. In this modification I have shown an arcuate slot 88 in the back of the casing 22. A bolt 90 may extend upwardly through said opening which is medially positioned between parallel concentric portions of the tube B. The bolt may have a clamping plate 92 screw-threadedly mounted upon the same. The plate 92 is adapted to engage the lower edges of the concentric sections 82 and 84 of the tube B. A similar clamping plate 94 may straddle the upper edges of the sections 82 and 84 and be held rigidly in position by the nut member 96. With this construction it can be seen that by loosening the nut 96 the bolt 90 may be moved in either direction in the slot 88, thus increasing or decreasing the free section of the tube B. By the use of this construction minute adjustments of the indicating mechanism may be easily and simply made.

Figure 7:
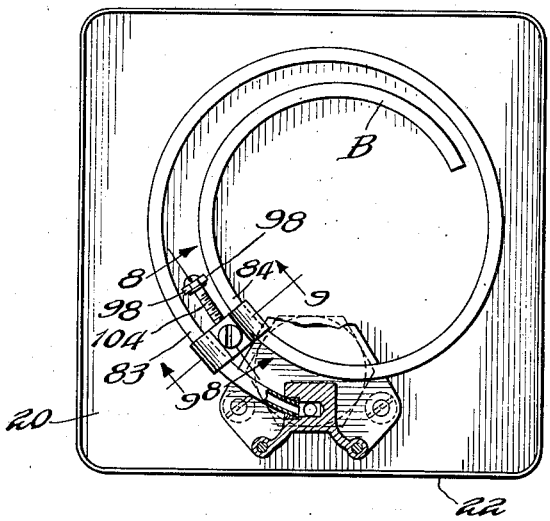
Fig. 7 is a fragmentary view showing a still further modified form of construction.
Figure 9:
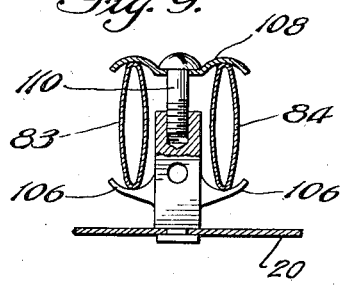
Fig. 9 is a sectional view taken at right angles of Fig. 8 showing the same details of construction.
Figure 8:
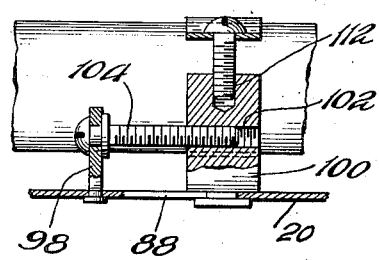
Fig. 8 is an enlarged sectional view of the same taken on the line 8—8 of Fig. 7.

In Figs. 7, 8 and 9 I have shown a further modified form of adjusting means. In this construction I have provided an upwardly projecting post 98 rigidly fastened in the back 20 of the gauge 22. I have provided a concentric slot 88 within which a block 100 is positioned for sliding movement. The block 100 is provided with a screw-threaded opening 102 to receive a bolt member 104. The bolt member 104 is positioned against axial movement in the post 98. The block 100 is provided with a pair of arm portions 106 which extend upon opposite sides of the same and embrace the lower edges of the tube sections 83 and 84.

A clamping plate 108 is provided to embrace the upper ends of the tube sections and may be rigidly clamped to the block 100 by a screw member 110 which engages the screw-threaded opening 112 in the block 100. In order to adjust the position of this type of clamp upon the concentric coils, it is necessary to loosen the screw 110 and by turning the bolt 104 the block 100 may be moved back and forth guided in the arcuate slot 88.

Figure 10:
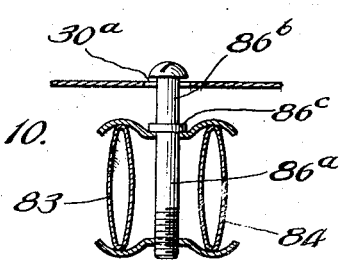
Fig. 10 is a further modified construction.

In Fig. 10 I have shown a still further modified form of the invention wherein the adjusting screw 86a is adapted to extend above the surface of the dial 30 through an arcuate slot 30a formed therein for this purpose. The screw 86a may be similar to that shown in Fig. 4 except for the extension 86b thereon and the shoulder 86c which is adapted to bear against the upper clamp member 82. With this construction it can be seen that in order to make a zero adjustment of the indicating needle 44, it is only necessary to remove the frame and the glass and adjust the tube B in the manner explained.

From the above and foregoing description it will be apparent to those skilled in the art that I have provided an integral tube construction for a pressure gauge which embodies a trap portion and a pressure responsive portion; that in this construction I have provided a portion intermediate its end rigidly supported and have permitted an extension therefrom which has a free operating end. The entire double coil loop is fastened to the gauge post at only one point and that is at the opening 70 to the conduit from the apparatus upon which the gauge is placed. With this construction it is immaterial whether the tube B is rolled uniformly or is shaped to exact diameters to pass through slots which may be provided in the gauge post for supporting the same. By providing only a single soldered joint in the construction I have eliminated the necessity of other soldering operations together with the attendant danger of leakage or deformation of the tube at those points.

While I have illustrated and described a specific embodiment of the invention, it will be apparent to those skilled in the art that changes and modifications may be made in the exact details shown, and I do not wish to limit myself in any particular; rather what I desire to secure and protect by Letters Patent of the United States is:

1. A pressure gauge comprising a post having a bore formed therein, means connected to the bore in said post comprising a coil formed of concentric convolutions of tubular structure having a continuous passage therein, said coil having a trap portion and a Bourdon tube portion, one end of the Bourdon tube being closed and movable responsive to pressure in said passage, and means for rigidly connecting the other end of said Bourdon tube section to and securing it against displacement with respect to said trap portion, said means including a pair of clamp members connecting parallel portions of said Bourdon tube and trap sections together.

2. A pressure gauge comprising a casing, a post supporting said casing and having a passage formed therein, an integral tubular member housed in said casing having one end connected to said passage and having a portion including a trap extending a substantial distance outside of said post, the opposite end of said member being flexible and responsive to pressure within said passage and tubular member, and means on and spaced from the flexible end of said member rigidly connected to another portion of said member spaced from the fixed end to form a rigid connection intermediate both ends of said tubular member, and indicating mechanism attached to the flexible end of the tubular member, said means comprising clamp members and a tightener associated therewith.

3. A pressure gauge comprising a casing, a post supporting said casing and having a passage formed therein, an integral tubular member housed in said casing having one end connected to said passage and having a portion including a trap extending a substantial distance outside of said post, the opposite end of said member being flexible and responsive to pressure within said passage and tubular member, and means on and spaced from the flexible end of said member rigidly connected to another portion of said member spaced from the fixed end to form a rigid connection intermediate both ends of said tubular member, and indicating mechanism attached to the flexible end of the tubular member, said means comprising a clamp member fastened to said casing.

4. A pressure gauge comprising a casing, a post supporting said casing and having a passage formed therein, an integral tubular member housed in said casing having one end connected to said passage and having a portion including a trap extending a substantial distance outside of said post, the opposite end of said member being flexible and responsive to pressure within said passage and tubular member, and means on and spaced from the flexible end of said member rigidly connected to another portion of said member spaced from the fixed end to form a rigid connection intermediate both ends of said tubular member, and indicating mechanism attached to the flexible end of the tubular member, said means comprising a clamp member fastened to said casing and adjusting means associated with said clamp member for changing the length of said trap and Bourdon tube sections.

5. A pressure gauge comprising a casing, a post supporting said casing and having a passage formed therein, an integral tubular member housed in said casing and having a rigid end portion including a trap extending a substantial distance outside of said post and communicating with said passage, the opposite end of said member being flexible and responsive to pressure within said passage and tubular member, and means connecting the rigid end portion of said tubular member and a portion of said member spaced from the flexible end to form a rigid connection therebetween, indicating mechanism attached to the flexible end of the tubular member, and adjusting means associated with said rigid connection to change the length of the Bourdon tube and trap sections of said tubular member.

6. A pressure gauge comprising a casing, a post supporting said casing and having a passage formed therein, a continuous integral tubular member formed in concentric convolutions and having a rigid end portion forming a complete convolution mounted on and extending a substantial distance outside of said post, the opposite end of said member being flexible and responsive to pressure within said passage and tubular member, and means on and spaced from the flexible end of said member rigidly connected to the rigid end portion of said member, indicating mechanism attached to the flexible end of the tubular member, a dial associated therewith, said dial having an arcuate slot therein, said rigid fastening means comprising a clamp member connecting concentric portions of said tubular member, and adjusting means associated therewith for varying the position of said indicating mechanism with reference to said dial, said adjusting means including a member extending upwardly through the arcuate slot in said dial.

GEORGE F. RUOPP.